(12) United States Patent
Poitau et al.

(10) Patent No.: US 8,619,923 B2
(45) Date of Patent: Dec. 31, 2013

(54) SYSTEM AND METHOD FOR OPTIMIZING USE OF CHANNEL STATE INFORMATION

(75) Inventors: Gwenael Poitau, Montréal (CA); Jonathan Labs, Montréal (CA)

(73) Assignee: Cavium, Inc., San Jose, CA (US)

( * ) Notice: Subject to any disclaimer, the term of this patent is extended or adjusted under 35 U.S.C. 154(b) by 508 days.

(21) Appl. No.: 12/988,348

(22) PCT Filed: Apr. 17, 2008

(86) PCT No.: PCT/CA2008/000722
§ 371 (c)(1),
(2), (4) Date: Apr. 11, 2011

(87) PCT Pub. No.: WO2009/127033
PCT Pub. Date: Oct. 22, 2009

(65) Prior Publication Data
US 2011/0176592 A1    Jul. 21, 2011

(51) Int. Cl.
*H03D 1/00*    (2006.01)
(52) U.S. Cl.
USPC ......................................................... 375/343
(58) Field of Classification Search
USPC ......................................................... 375/343
See application file for complete search history.

(56) References Cited

U.S. PATENT DOCUMENTS

| | | | |
|---|---|---|---|
| 6,757,299 B1 * | 6/2004 | Verma | 370/482 |
| 2006/0182015 A1 | 8/2006 | Kim | |
| 2006/0222097 A1 | 10/2006 | Gupta et al. | |
| 2006/0291371 A1 | 12/2006 | Sutivong et al. | |
| 2007/0153731 A1 | 7/2007 | Fine | |
| 2008/0123763 A1 * | 5/2008 | Moher | 375/260 |

OTHER PUBLICATIONS

Int'l Search Report issued on Dec. 18, 2008 in Int'l Application No. PCT/CA2008/000722.
Written Opinion issued on Dec. 18, 2008 in Int'l Application No. PCT/CA2008/000722.

* cited by examiner

*Primary Examiner* — Juan A Torres
(74) *Attorney, Agent, or Firm* — Cooley LLP

(57) ABSTRACT

The present invention relates to a combiner, channel identifier, Orthogonal Frequency Division Multiplexing (OFDM) receiver and method for optimizing use of channel state information of a received signal. The method comprises analyzing a received signal in a time domain and extracting from the received signal characteristics of a communication channel. The method furthermore comprises determining a dynamic indicator of channel station information accuracy based on the characteristics of the received signal. Additionally, the method comprises applying a weight to the channel state information according to the dynamic indicator.

12 Claims, 11 Drawing Sheets

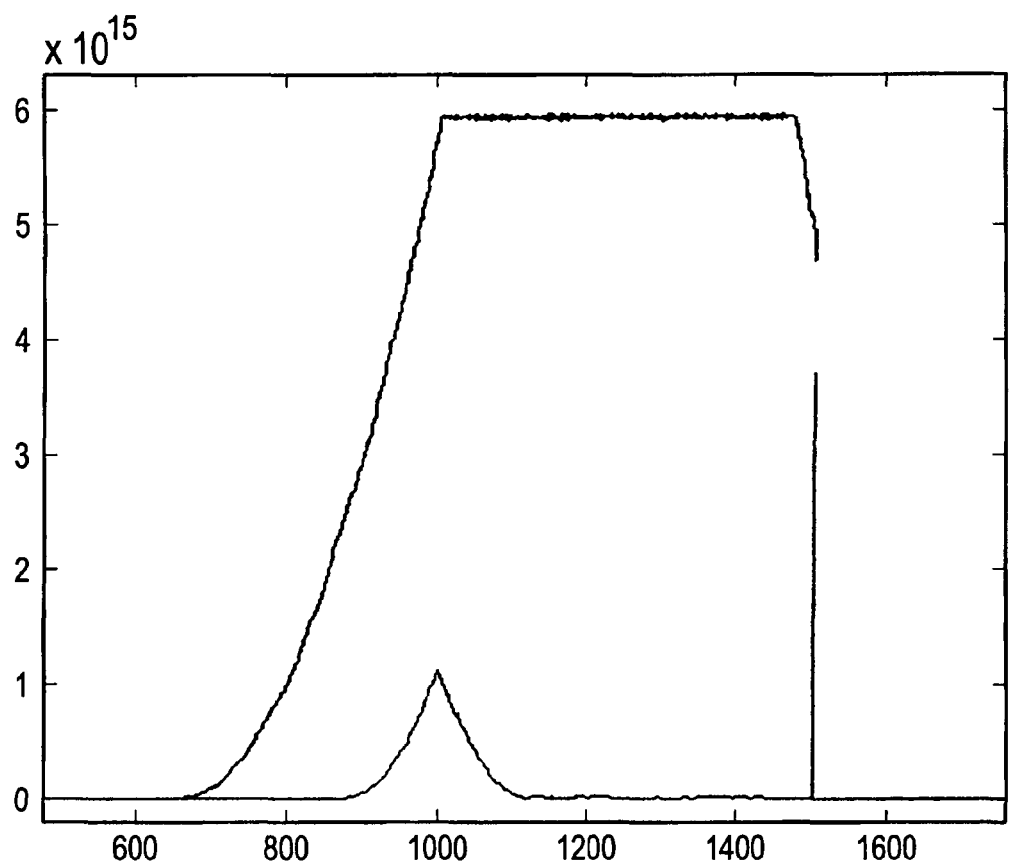
FIG_3A csi_weight = csi_weight_default

1) Find the amplitude A1 of the maximum crosscorreclation peak
2) Do the following tests:
   a. Is second maximum crosscorrelation peak > A1/k1
      If Yes then: csi_weight = csi_weight1
   b. Is there other crosscorrelation peak > A1/k2
      If Yes then: csi_weight = csi_weight2
   c. Is there other crosscorrelation peak > A1/k3
      If Yes then: csi_weight = csi_weight3

Where k1>k2>k3
And csi_weight1 < csi_weight2 < csi_weight3

FIG. 4

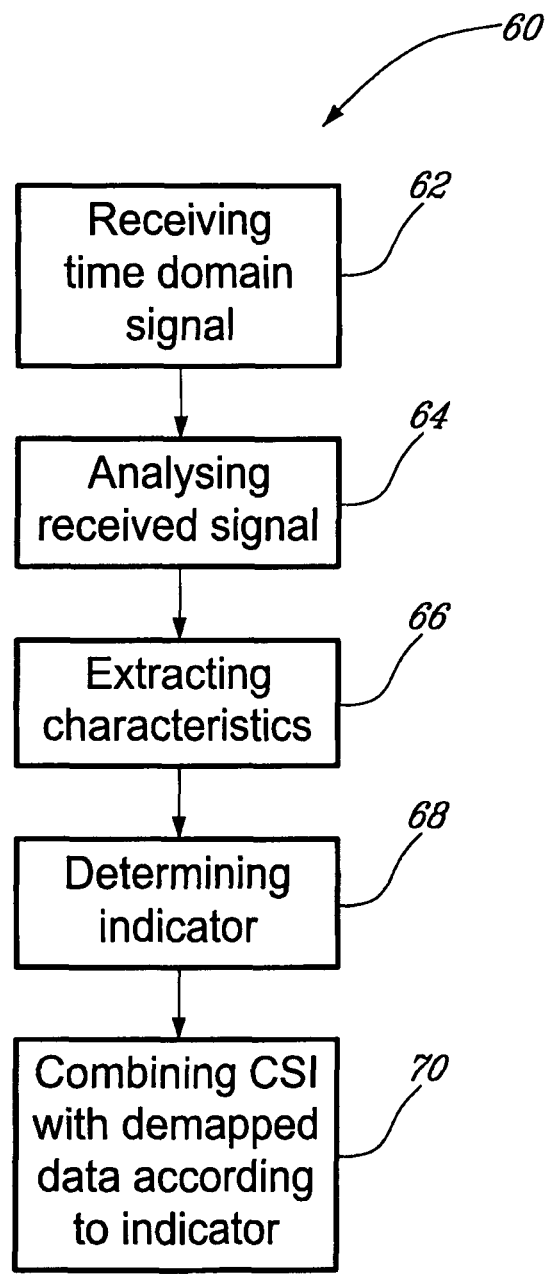

SYSTEM AND METHOD FOR OPTIMIZING USE OF CHANNEL STATE INFORMATION

CROSS-REFERENCE TO RELATED APPLICATION

This application is a section 371 of International Application No. PCT/CA2008/000722, filed Apr. 17, 2008, which was published in the English language on Oct. 22, 2009 under International Publication No. WO 2009/127033 A1 and the disclosure of which is incorporated herein by reference.

FIELD OF THE INVENTION

The present invention relates to a system and method for optimizing use of channel state information. More particularly the present invention relates to a system and method for optimizing use of channel state information of a received OFDM (Orthogonal Frequency Division Multiplexing) signal.

BACKGROUND OF THE INVENTION

In the last decades, the interest toward wireless communications has greatly increased. Such an interest has pushed the development and refinement of wireless protocols and technologies. All types of wireless communications have one thing in common: they allow data transmission over the air. However, transmitting data over the air introduces issues such as interference, distortion and multipath propagation. To overcome such issues, multiple techniques for treating received data signals have been developed in combination with more robust modulation techniques. Some of the mostly used modulation techniques include Orthogonal Frequency Division Multiplexing (OFDM) and Orthogonal Frequency Division Multiplexing Access (OFDMA).

More particularly, in OFDM and OFDMA, multiple signals are modulated on different sub-carriers that operate on different frequencies. These sub-carriers are then added together to create a composite signal. The composite signal is afterwards modulated onto a single carrier frequency for transmission over the air from one device to another. The essence of an OFDM signal lies, however, in the way the sub-carriers are placed with respect to each other. The sub-carriers are chosen so as to have orthogonally spaced sub-carriers to avoid inter-carrier interference.

To further increase the accuracy of a decoded OFDM signal, a method called soft-demapping is applied to the signal. In OFDM receivers, a soft-demapper module performs constellation demapping by indicating, for each bit of a symbol, the level of confidence that a bit is either a "0" or a "1". The output of the soft-demapper is used by a decoder. This method provides a high level of accuracy when the channel is frequency non-selective. For instance, white noise and flat fading generates on average the same SNR (Signal to Noise Ratio) for all sub-carriers in a signal.

However, intersymbol interference resulting from multipath propagation affects each sub-carrier differently and is therefore considered as being frequency selective: each sub-carrier has a different level of SNR depending on the amplitude of the sub-carrier channel response. A generalized method for symbol estimation such as soft-demapping leads to a low level of accuracy when in presence of frequency selective interference. It is therefore necessary to use other methods for establishing the confidence level of symbols in each sub-carrier.

Many have proposed various methods for establishing the CSI indicator for each sub-carrier. One of the ways used for determining the CSI indicator is through an interpolation of an estimated SNR for pilot carriers. The estimated SNR for each pilot carrier is established by processing the pilot carriers through a CSI computation module of the OFDM receiver. The CSI computation module is then capable of establishing the estimated SNR for each sub-carrier. The generated CSI estimate for each sub-carrier is then taken into consideration by the decoder.

Several have tried to combine the SNR estimates originating from both frequency non-selective and frequency selective interferences. In Kim, US patent application 2006/0182015, an apparatus and method of estimating a CPE (Common Phase Error) uses data and pilot sub-carriers for establishing a CSI indicator. For each sub-carrier, a CSI indicator is estimated from the Discrete Fourier Transform (DFT) signal. The CPE is generated from a CPE estimation unit that uses as input an equalized signal and the CSI indicator. A Soft-Demapper then demaps the CPE compensated equalized signal for decoding.

In the same line of thought, in Gupta et al., US patent application 2006/0222097, is disclosed a method that teaches a SNR based selection filter. The method further teaches the use of the filter in combination with a DFE (Decision Feedback Equalizer) with which is then combined a WCSI (Weighted Channel State Information). The WCSI is used by the decoder, which is modified to give decoding weights to symbols proportional to channel estimation. The channel estimation is performed in a frequency domain.

Although the systems presented by Gupta et al. and in Kim may provide a respectable level of accuracy in the decoded data, several computational modules must be added to the conventional OFDM receiver. It is needless to say that the addition of computational modules decreases the efficiency of the OFDM receiver. As OFDM receivers are integrated in various communication units such as devices that generate high levels of data traffic, it is thus important that the OFDM receiver manages to maintain its efficiency and consume as little power as possible. It would therefore be useful to have an OFDM receiver that is capable of increasing the level of data accuracy regardless of the environment or signal propagation conditions while remaining efficient and consuming as little power as possible.

SUMMARY OF THE INVENTION

The present invention relates to a system and method for optimizing use of channel state information. More specifically, the present invention relates to a system and method for optimizing use of channel state information of an OFDM received signal.

In accordance with an aspect of this invention, the method comprises analyzing a received signal in a time domain and extracting from the received signal characteristics of a communication channel. The method furthermore comprises determining a dynamic indicator based on the characteristics of the received signal.

In accordance with another aspect of this invention, the method comprises a step of applying a weight to the channel state information according to the dynamic indicator.

Based on another aspect of this invention, the method comprises a step of applying a weight to the demapped data according to the dynamic indicator.

It is furthermore an aspect of this invention to provide for the combination of the demapped data and the channel state information in accordance with the dynamic indicator.

According to another aspect, the present invention provides for a channel state information combiner, which comprises an input for receiving an indicator of channel information accuracy estimated from a time domain signal. The combiner further comprises an input for receiving demapped data, and an input for receiving channel state information. Then, the combiner dynamically combines the demapped data and the channel state information in accordance with the indicator.

In accordance with yet another embodiment, the present invention relates to a channel identifier for estimating an indicator of channel state information accuracy. The channel identifier comprises an input for dynamically receiving a time domain signal, an estimation module for estimating the indicator based on the time domain signal, and an output for transferring the indicator of channel state information accuracy.

In accordance with another aspect of the present invention, there is also provided an OFDM receiver adapted for optimizing use of channel state information. The receiver comprising a channel identifier and a channel state information combiner. The channel identifier is adapted for estimating an indicator of channel state information accuracy based on dynamically received time domain signal. In turn, the channel state information combiner is adapted for receiving the indicator, demapped data and channel state information and for combining the channel state information and the demapped data according to the indicator.

BRIEF DESCRIPTION OF THE DRAWINGS

For a better understanding of embodiments of the systems and method described herein, and to show more clearly how they may be carried into effect, reference will be made by way of example, to the accompanying drawings in which:

FIG. 3A is a graph depicting exemplary results of an autocorrelation of FIG. 3;

FIGS. 3C, 3D and 3E represent graphs of exemplary results of the summing of the crosscorrelation of FIG. 3;

FIG. 4 is an exemplary algorithm for determining an indicator of the channel state information accuracy in accordance with an embodiment of this invention;

FIG. 6 is a flowchart of an embodiment of a method for improving use of channel state information in an OFDM receiver in accordance with another aspect of the present invention.

DETAILED DESCRIPTION OF THE INVENTION

In the field of telecommunication, several standards have been developed for transceiving wireless signals between telecommunication devices. As standards for transceiving wireless signals have been established, efforts are placed in various areas for improving the general quality of a wireless communication between devices. The focus of the present invention relates to a particular subset of those standards, namely standards that include modulation schemes in which known and predictable parameters are sent on a regular basis, such as OFDM (Orthogonal Frequency Division Multiplexing). Furthermore, the present invention relates to an improved OFDM receiver, a combiner, a channel identifier, and a corresponding method.

For facilitating the understanding of the present invention, the modules of a conventional OFDM receiver such as found in the prior art will first be described with reference to FIG. 1. The OFDM receiver 10 is essentially divided into two sections, a pre-DFT (Discrete Fourier Transform) section 11*a* and a post-DFT section 11*b*. The pre-DFT section 11*a* comprises inter-communicating modules that operate on time domain signals. The post-DFT section 11*b* comprises another set of inter-communicating modules that operate on frequency domain signals.

Figure 1:
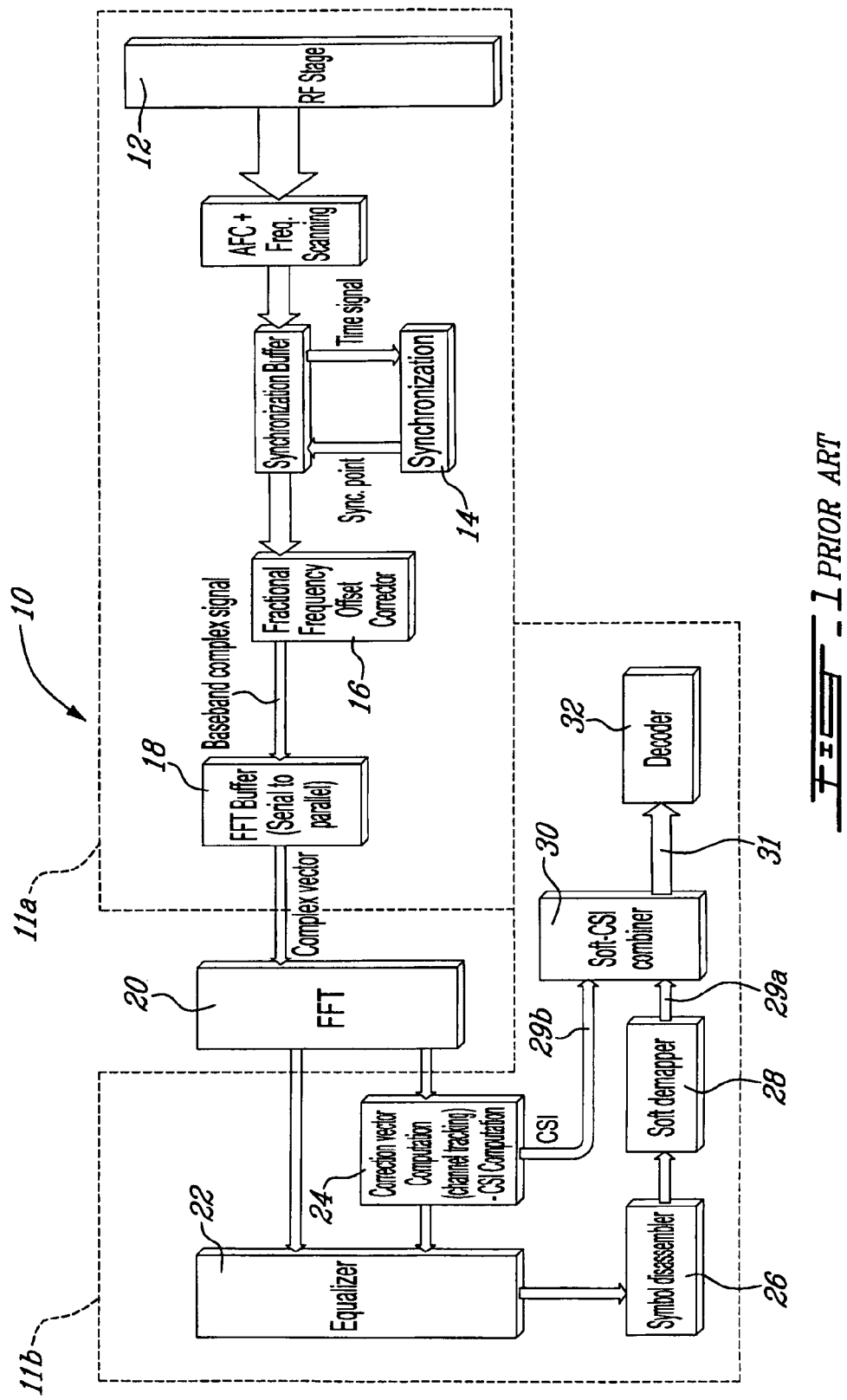
FIG. 1 is a block diagram depicting modules of an OFDM receiver as known in the art.

Starting with the modules of the pre-DFT section 11*a*, FIG. 1 depicts sequentially linked modules such as an RF stage module 12, a synchronization module 14, a Fractional Frequency Offset Corrector 16 and an DFT Buffer 18. The following paragraphs provide a functional overview of each pre-DFT section 11*a* module.

The OFDM receiver 10 is adapted to receive an RF (Radio Frequency) signal by way of an RF stage module 12. The RF stage module 12 is the entry point of the signal that has been transmitted, and it includes the Analog to Digital Converter (ADC) for digitizing the signal into samples. However, before reaching the receiver 10, the transmitted signal has been affected by the environment through which it travels; as a matter of fact the transmitted signal is affected by a combination of factors such as interference, distortion, multipath propagation, etc. These factors have the capacity to degrade the received signal and by consequence corrupt the transmitted data in the signal.

The synchronization module 14 is located at the output of the RF stage module 12. The synchronization module 14 is required in the receiver 10 for aligning in the time domain the OFDM symbols that were transmitted. Typically, this synchronization includes detecting training information (i.e. pilot data) embedded in the signal. Once synchronized in time, a phase adjustment of each sub-carrier is performed by the Fractional Frequency Offset Corrector module 16 to synchronize in frequency.

Once the signal has been synchronized, the N digitized samples are buffered by the DFT (Discrete Fourier Transform) Buffer module 18. The Buffer module 18 generates a vector of samples within the signal for facilitating the further transformation of the time domain sub-carrier signal into the frequency domain signal.

Further presented in FIG. 1, the vector of samples generated by the DFT Buffer module 18 is used as input for the DFT module 20. The DFT module 20 is adapted to transform the time domain signal into the frequency domain signal. As a result, the output of the DFT module 20 provides a frequency domain signal of N points for use within the modules of the post-DFT section 11*b*.

In turn, the post-DFT section 11*b* modules comprise an equalizer module 22, a correction vector and channel state information computation module 24 (computation module 24), a symbol disassembler module 26, a soft demapper module 28, a soft-CSI (Channel State Information) combiner module 30 and a decoder module 32. The next paragraphs present an overview of how these modules operate.

The frequency domain signal generated by the DFT module 20 is used as input for the equalizer module 22 and the computation module 24. The equalizer module 22 adjusts the amplitude and phase of each sub-carrier. The adjustment is necessary, as a gain and phase is introduced at each subcarrier by the wireless communication channel. For making the adjustment, the equalizer module 22 requires a second input consisting of a correction vector. The correction vector is previously computed by the computation module 24.

In OFDMA technology, the equalized sub-carriers are further disassembled (frequency de-interleaved—indeed OFDMA technology involves an optimal frequency interleaving of the subcarriers to improve robustness in deep frequency fading) into symbols by the symbol disassembler module 26. The symbols are in turn used by the soft demapper module 28. The soft demapper module 28 provides a demapped data 29a of the level of accuracy for each symbol. This demapped data 29a is known to be accurate for counteracting frequency non-selective interference such as white noise and Flat Fading. On the other hand, it is known that for counteracting frequency selective interference such as interference produced by multipath propagation a CSI (Channel State Information) 29b must also be taken into consideration. Thanks to the computation module 24, a CSI 29b for each sub-carrier is determined.

As a transmitted signal is exposed to both frequency selective and frequency non-selective interferences, a combination of both demapped data 29a and CSI 29b is desirable. The soft-CSI combiner module 30 takes into consideration the demapped data 29a from the soft-demapper module 28 and the computed CSI 29b from the computation module 24 and provides for each symbol combined accuracy information 31. The demapped data 29a component and the computed CSI 29b component are combined according to a fixed weight. For example, the combiner uses a fixed weight of seventy percent for the demapped data 29a component and thirty percent for the computed CSI 29b component. The weight to be used by the combiner module 30 is set according to a predetermined weight that has proven to be most appropriate in the majority of the cases.

It is however recognized that the received signal has been subjected to various and varying forms of interference due to changes in the environment and movement of the transmitter or the receiver. It is therefore necessary to provide a receiver 10 that is capable of better adapting to environmental changes so as to provide decoded signal of greater accuracy. The present invention proposes such a solution and describes such a system.

Figure 2:
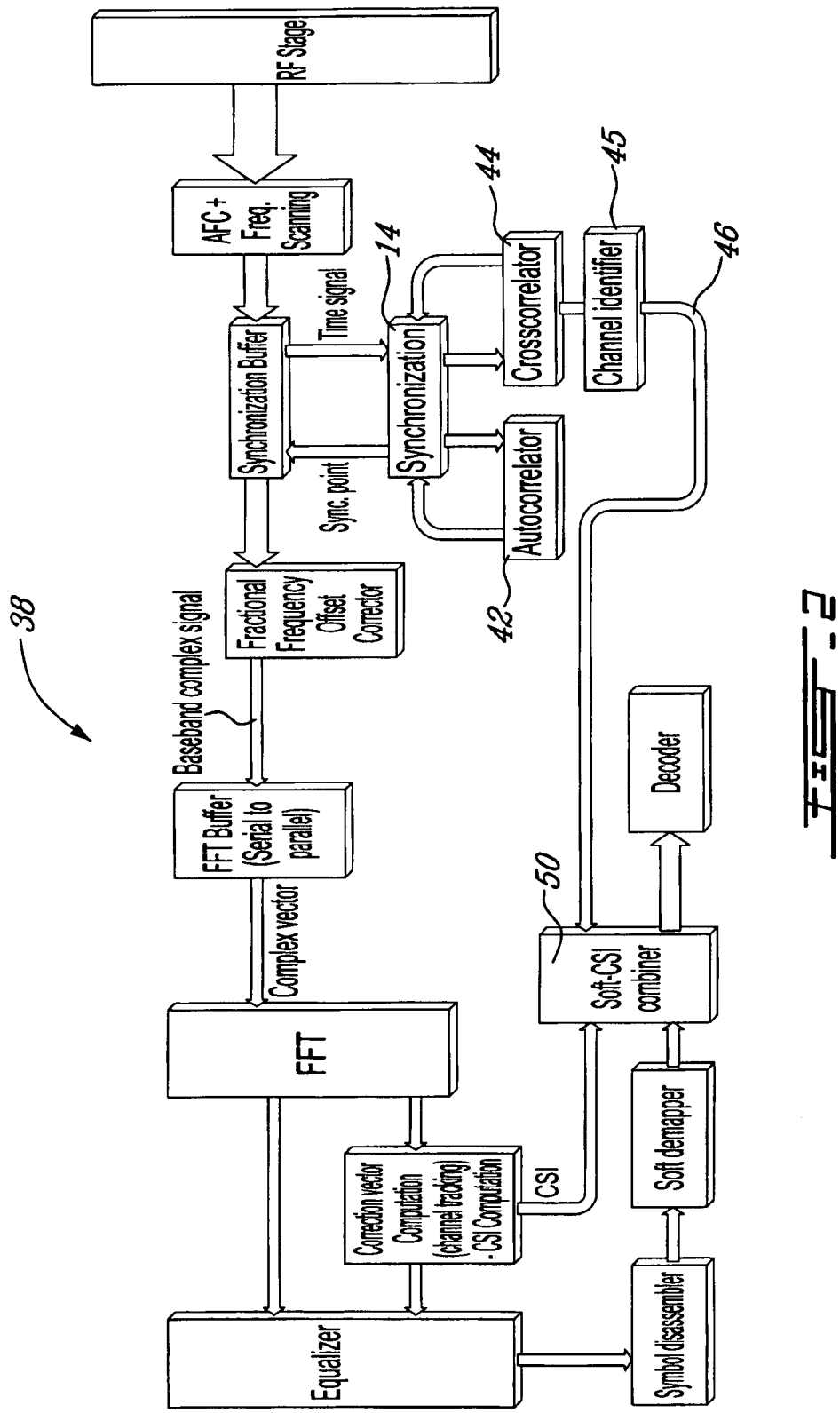
FIG. 2 is a block diagram depicting modules of an OFDM receiver adapted for optimizing use of channel state information in accordance with an embodiment of this invention.

Presented in FIG. 2, in accordance with an embodiment of the present invention, is a receiver 38 comprising a synchronization module 14, an autocorrelator 42, a crosscorrelator 44 and a channel identifier 45, all located in the pre-DFT section 11a of the receiver 38. More particularly, the synchronization module 14 synchronizes the OFDM symbols according to the training symbol that is present in each frame structure. In turn, the channel identifier 45 concurrently uses the crosscorrelation result to determine an indicator of the CSI accuracy (indicator 46).

Figure 3:
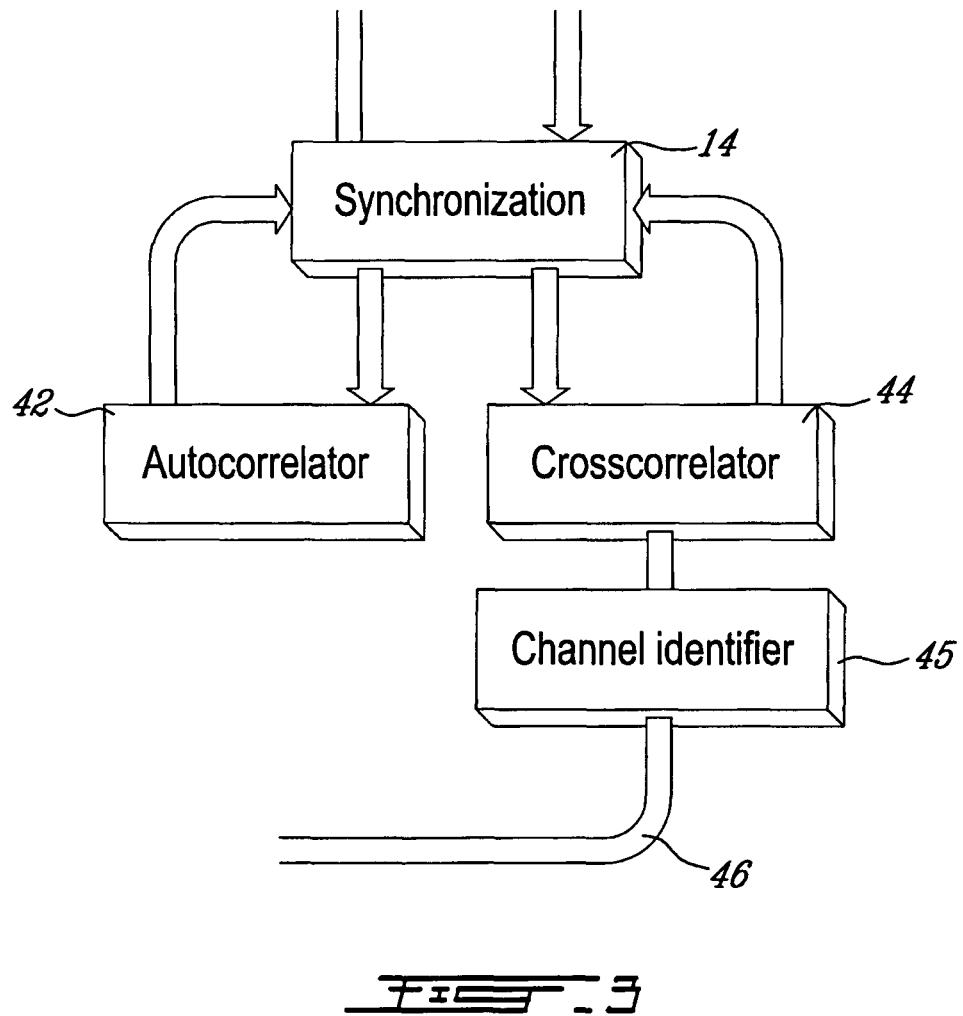
FIG. 3 is a block diagram depicting specific modules in accordance with an embodiment of this invention.

Presented in FIG. 3, in according to an embodiment of the present invention, is a functional representation parts of interest of the pre-DFT section 11a of the receiver 38. The autocorrelator module 42 and the crosscorrelator 44 are adapted to locate a synchronization point such as a training symbol or a preamble. Then, the channel identifier 45 uses the crosscorrelation result to determine the CSI accuracy indicator 46. It will be apparent to those skilled in the art that the crosscorrelator 44 and the channel identifier 45, although depicted as two separate functional modules, could alternatively be implemented as a single module.

There are many known ways for the autocorrelator to locate the training symbol, for example the identification of the training symbol could be performed in four steps: autocorrelating the received signal, locating a plateau, auto-correlating a part of the plateau, and locating a peak on the obtained curve. In the following paragraphs, this four-step autocorrelation example is explained in further detail.

In the case of an OFDMA system like Wimax/WiBro, as a frequency pattern of the training symbol is only populated with one third of the sub-carriers, there is a (N/3)-pattern repetition (for a size N of DFT) in the time domain. This (N/3)-pattern repetition can be identified by an autocorrelation (eq. 1 and 2).

$$a(n) = \sum_{k=0}^{N/3-1} s(n+k) \times s(n+k+N/3)^* \quad (1)$$

$$aa(n) = |a(n)|^2 \quad (2)$$

This autocorrelation results in a plateau of (2N/3) samples shown on FIG. 3A (for N=1024). The information obtained from the autocorrelation may be used for multiple purposes. A particular example of use of the autocorrelation results pertains to OFDM and OFDMA. More particularly, in modulation techniques such as OFDM and OFDMA symbols contain a cyclic prefix (CP), which is a copy of the last M samples of the symbol put in front of the symbol. Thus, a good estimate of the synchronization point can be given by a second autocorrelation on the cyclic prefix (Eq. 3 and 4).

$$a2(n) = \sum_{k=0}^{M-1} s(n+k) \times s(n+k+N)^* \quad (3)$$

$$aa2(n) = |a2(n)|^2 \quad (4)$$

One can consider the WIBRO application as an example. In that technology, N=1024, N/3=341 and M=128. For a perfect channel, the two autocorrelations outputs of the received signal are represented in FIG. 3a, where the curve with the plateau represents the results of the first autocorrelation and the other curve represents the results of the second autocorrelation. Thus, one can clearly see the window of (2N/3 samples, here 682) given by the first autocorrelation as well as the accurate synchronization point given by the peak index of the second autocorrelation, which corresponds to a beginning of the training symbol. This first section of the profiling method is quite precise especially against important frequency offsets as only autocorrelations are used.

Returning to FIG. 3, the crosscorrelator module 44 in turn is adapted to extract a reference waveform and crosscorrelating the identified reference waveform with the located training symbol. The following paragraphs describe in further detail an example of a method used for extracting a reference waveform and crosscorrelating the identified reference waveform with the located training symbol. Furthermore, the crosscorrelator module 44 may also be used, as known in the art, to improve the synchronization in multipath environment.

Reference waveforms representing all possible training symbols in the frequency domain and/or the time domain could be stored in memory. Once the training symbol has been identified, the corresponding reference waveform can then be identified. Following this, the identified reference waveform in time domain is then crosscorrelated, with the identified training symbol (eq. 5 and 6).

$$c(n) = \sum_{k=0}^{N/3-1} s(n+k) \times r(k)^* \quad (5) \quad c2(n) = |c(n)|^2 \quad (6)$$

Figure 3B:
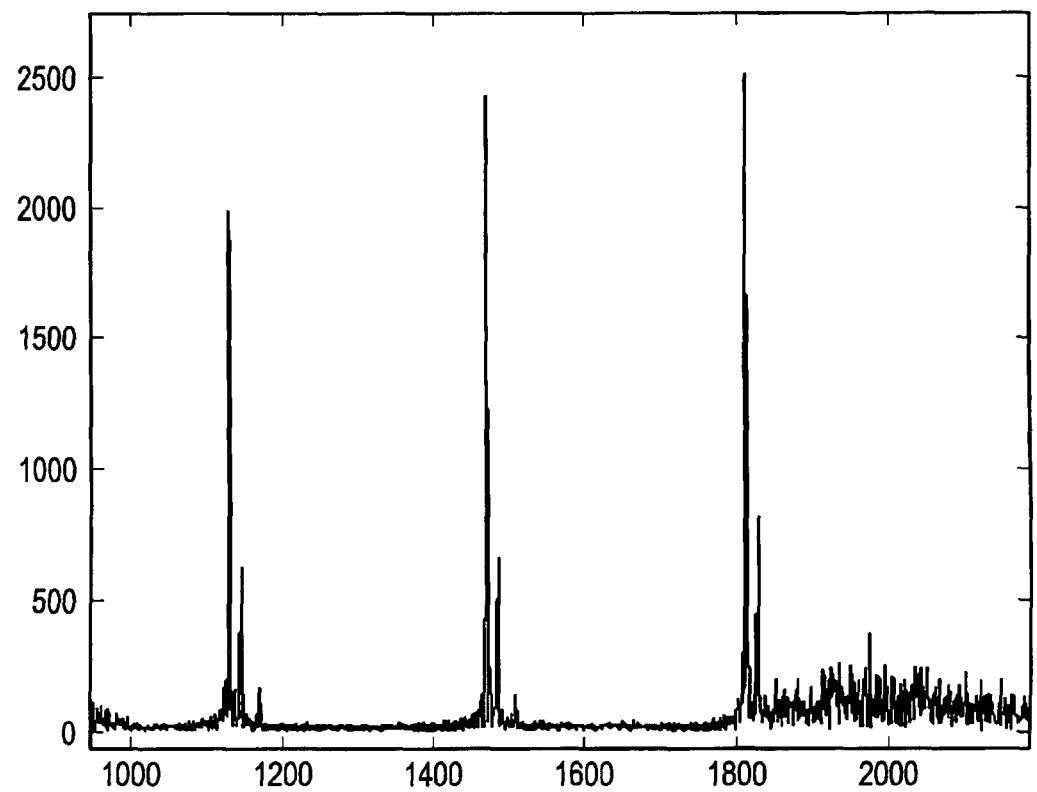
FIG. 3B is a graph depicting exemplary results of a crosscorrelation of FIG. 3.
Figure 3C:
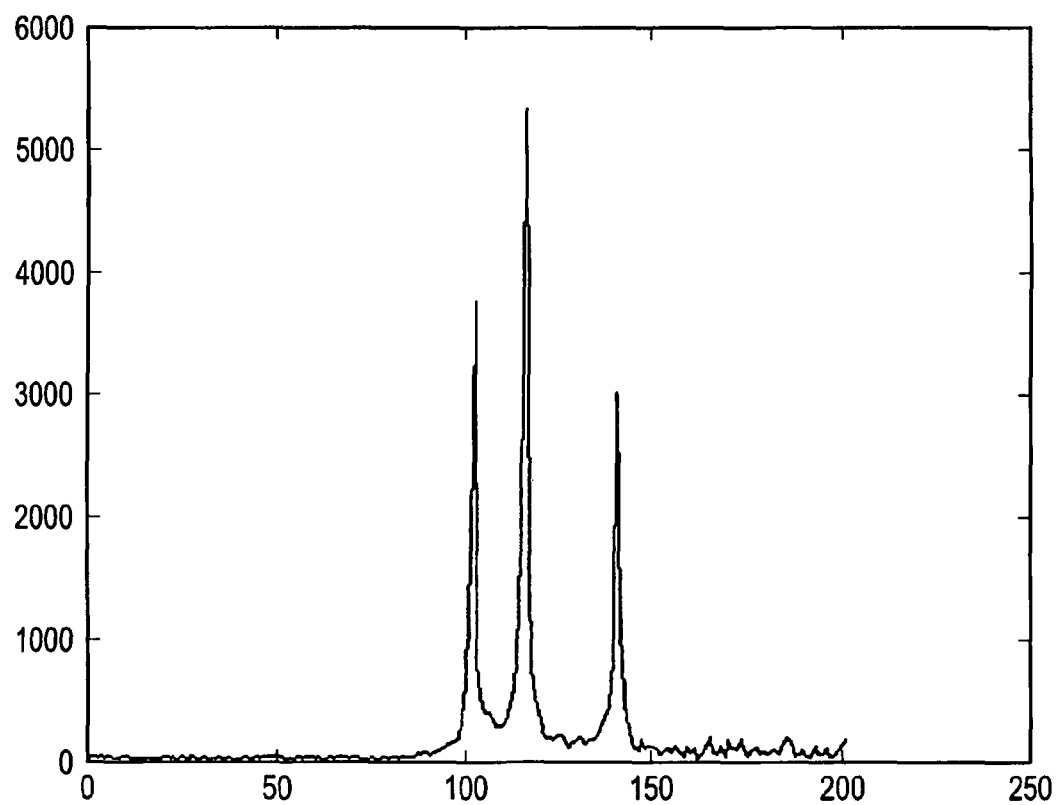
Figure 30:
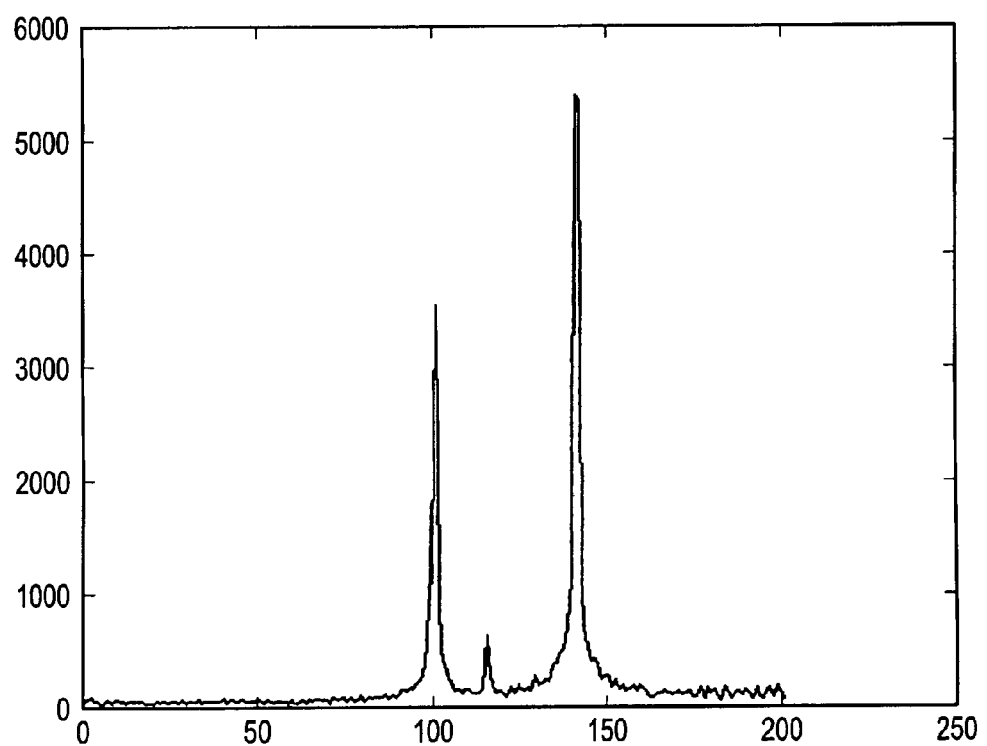
Figure 3E:
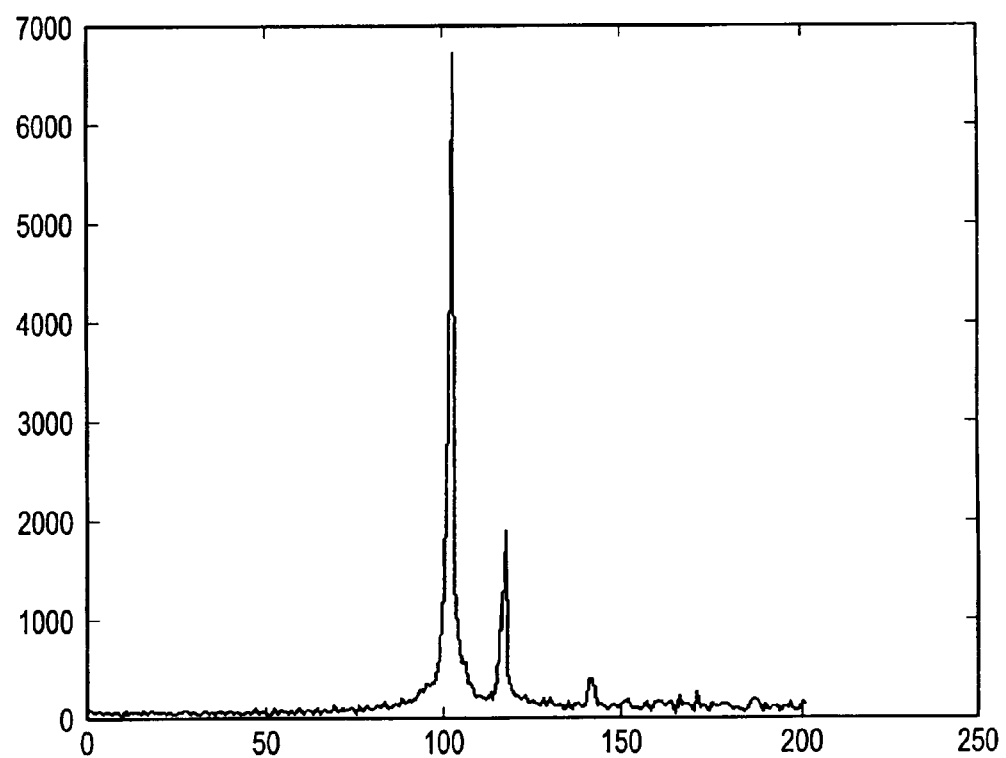

For example, with the OFDMA modulation, as there is a 3.times.-repetition of the same pattern in the training symbol, the result for the crosscorrelation will correspond to the graph shown on FIG. 3B. The result for the crosscorrelation can be summed up (for better accuracy) such as depicted on FIGS. 3C, 3D and 3E. The three peaks of FIGS. 3C, 3D and 3E correspond to three different paths with amplitudes proportional to a power of the path. For example, in FIG. 3C, it is the second peak that has the greatest amplitude, while in FIG. 3D it is the third peak and in FIG. 3E it is the first peak.

In addition to extracting a reference waveform and crosscorrelating the identified reference waveform with the located training symbol, crosscorrelator module 44 is also adapted to concurrently, determine the indicator 46. Presented in FIG. 4, is an example of an algorithm for determining the indicator 46 in the time domain. More particularly, the algorithm tries to determine to what extent the received signal is affected by multipath. When the received signal is significantly affected by multipath, the indicator 46 is set to provide a greater consideration toward computed CSI 29b value rather then toward the demapped data 29a. Alternatively, when the received signal is minimally affected by multipath, the indicator 46 is set to provide a greater consideration for the demapped data 29a rather then for the computed CSI 29b value.

For doing so, the algorithm, of which an example is shown on FIG. 4, consists of first setting the indicator 46 to a default value. Then finding the amplitude of a maximum crosscorrelation peak. And at last, performing a multi-step test by setting the indicator 46 to a value depending on the number of significant crosscorrelation peaks and the amplitude of the significant crosscorrelation peaks. The significance of the crosscorrelation peaks is determined with respect to the amplitude of the maximum crosscorrelation peak.

It should be apparent to a person skilled in the art that other algorithms or procedures could also be used for determining the value of the indicator 46. For example, the algorithm could take into consideration a fewer or a greater number of peaks. Alternatively, or concurrently, the value for identifying cross-correlation peaks of interest could be calculated differently. The main point of interest being that the indicator 46 considered by the soft combiner is based on time domain channel state information.

Figure 5:
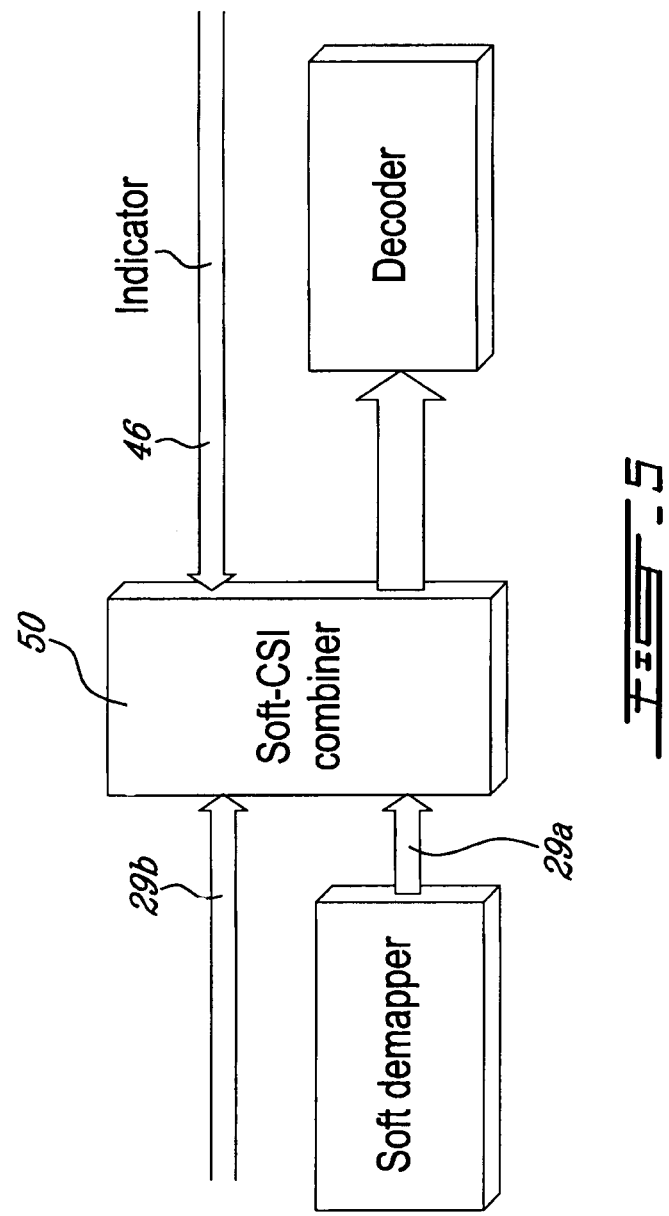
FIG. 5 is a block diagram depicting a combiner module in accordance with an embodiment of this invention.

Returning to FIG. 2 and concurrently presented in FIG. 5, the present invention further provides for a dynamic soft-CSI combiner module 50 (dynamic combiner module 50), which receives and handles the demapped data 29a, the CSI 29b and the indicator 46. The demapped data 29a and the computed CSI 29b are dynamically determined in the post-DFT section 11b. However, the indicator 46 is dynamically determined in the pre-DFT section 11a of the receiver 10. The dynamic combiner module 50 combines the demapped data 29a with the CSI 29b in accordance with the indicator 46. According to an embodiment of this invention, the indicator 46 is a weighting factor and the dynamic combiner module 50 applies the following formula for calculating a combined result (eq. 7).

$$llr = k * llr\_soft + (1-k) * llr\_csi \quad (7)$$

where $0 <= k <= 1$

To a person ordinarily skilled in the art, it should be apparent that the formula for calculating the combined result is modifiable.

Moreover, the format of the indicator 46 is also variable. Depending on the format of the dynamic indicator, rather than applying a weight to the demapped data 29a or to the CSI 29b various optimizing operations may be applied to either or to both the demapped data 29a and the CSI 29b.

According to one embodiment, the indicator 46 is a digital indication of the level of accuracy of the CSI 29b. Based on the indicator 46 the dynamic combiner module 50 determines a weighting factor that best corresponds to the level of accuracy of the CSI 29b.

Now that the improved OFDM receiver 10 has been described with respect to its modules, focus of the following paragraphs is turned to the method of optimizing use of the CSI. Presented in FIG. 6 is a method 60 for optimizing use of CSI, the method 60 comprises a sequence of steps that consists of receiving a time domain signal step 62, analyzing the received signal step 64, extracting characteristics of the received signal step 66, determining an indicator in step 68 and combining demapped data with the CSI according to the indicator step 70.

The receiving step 62 of the method consists of capturing a transmitted OFDM signal. As stated earlier, the transmitted signal is altered by the environment through which it has traveled. The received signal must therefore be analyzed for further processing. The analyzing step 64 consists of synchronizing the signal for aligning the OFDM symbols according to a training symbol. It should be kept in mind that other various types or combination of signal analysis methods may be performed in the analyzing step 64.

The extracting step 66 takes as input the outcome of the analyzing step 64 for further determining various characteristics of the received signal. Among others the extracting step 66 provides for the extraction of characteristics with respect to the CSI 29b level of accuracy, as concurrently presented in FIG. 5. According to an embodiment of this invention, the extracting step 66 comprises the selection of a maximum peak in the received signal. In addition to this, the extracting step 66 further comprises identifying residual peaks within a ratio of amplitude of the maximum peak. The residual peaks are known as echoes of the transmitted signal that are produced due to the effect of multipath propagation.

Following the extracting step 66, the determining indicator step 68 is provided for determining an indicator based on the extracted characteristics. One of the ways of determining an indicator 46 is by considering the number of residual peaks that are within a ratio of the amplitude of the maximum peak. Another way of determining an indicator 46 is simply by considering the number of residual peaks. Alternatively, another way of determining an indicator 46 is based on a combination of the number of residual peaks and the amplitude of the residual peaks. As a result, it will be understood by a person skilled in the art that there are various ways of determining the indicator 46.

Once the indicator 46 is determined, the combining of the demapped data with the CSI according the indicator, step 70, takes place. The combining step 70 is performed by applying a formula that takes into consideration the demapped data 29a, the CSI 29b and the indicator 46. Various formulas may be applied depending on the format of the indicator 46. In addition to this, again depending on the format of the indicator 46, the indicator may only be applied to the CSI 29b or may only be applied to the demapped data 29a.

The present OFDM receiver, combiner, channel identifier and method have been described with regard to various possible embodiments. The description as much as the drawings were intended to help the understanding, rather than to limit its scope. Various modifications may be made to the present invention without departing from the scope of protection sought in accordance with the appended claims.

The invention claimed is:

1. A method for optimizing use of channel state information, the method comprising the steps of:

analyzing a received signal in the time domain;
extracting from the received signal characteristics of a communication channel;
determining a dynamic indicator based on the characteristics, wherein determining includes adjusting the dynamic indicator according to a combination of a number of residual peaks and amplitudes of the residual peaks; and
applying the dynamic indicator to the channel state information.

2. The method for optimizing use of channel state information of claim 1, wherein the step of applying the dynamic indicator includes:
combining the channel state information to a demapped data according to the dynamic indicator.

3. The method for optimizing use of channel state information of claim 1 wherein the extracting step comprises:
selecting a maximum peak in the received signal; and
identifying residual peaks within a ratio of amplitude of the maximum peak.

4. A channel state information combiner comprising:
an input for receiving an indicator of channel information accuracy estimated from a time domain signal;
an input for receiving demapped data;
an input for receiving channel state information; and
a combining module for dynamically combining the demapped data and the channel state information in accordance with the indicator, wherein the indicator is set to provide greater consideration toward the channel state information rather than the demapped data when the received signal is significantly affected by multipath interference as estimated from the time domain signal.

5. The channel state information combiner of claim 4 wherein the combining module is adapted to apply a weight to the channel state information in accordance with the indicator.

6. The channel state information combiner of claim 5 wherein the combining module is adapted to apply to the demapped data a complementary portion of the weight.

7. A channel identifier for estimating an indicator of channel state information accuracy comprising:
an input for dynamically receiving a time domain signal; and
an estimation module for estimating the indicator based on the time domain signal, wherein the estimation module establishes the indicator according to the number of residual peaks in the time domain signal.

8. The channel identifier of claim 7 wherein the estimation module comprises a signal analyzer for identifying a maximum peak in the time domain signal.

9. The channel identifier of claim 8 wherein the signal analyzer further identifies residual peaks in the time domain signal, the residual peaks being within a ratio of the maximum peak's amplitude.

10. An Orthogonal Frequency Division Multiplexing (OFDM) receiver adapted for optimizing use of channel state information comprising:
a channel identifier for estimating an indicator of channel state information accuracy based on dynamically received time domain signal; and
a channel state information combiner having an input for receiving the indicator, demapped data and channel state information and for combining the channel state information and the demapped data according to the indicator, wherein the indicator is set to provide greater consideration toward the channel state information rather than the demapped data when the received time domain signal is significantly affected by multipath interference.

11. The OFDM receiver of claim 10 further comprising an autocorrelator and a crosscorrelator adapted for analyzing and profiling the received time domain signal.

12. The OFDM receiver of claim 10 wherein the combiner further comprises an output for transferring combined demapped data and channel station information to a decoder.

* * * * *

UNITED STATES PATENT AND TRADEMARK OFFICE
CERTIFICATE OF CORRECTION

PATENT NO. : 8,619,923 B2
APPLICATION NO. : 12/988348
DATED : December 31, 2013
INVENTOR(S) : Gwenael Poitau et al.

It is certified that error appears in the above-identified patent and that said Letters Patent is hereby corrected as shown below:

In the Specification

Column 6, Line 66, please delete "c(n)=k=0N/3-1s(n+k).times.r(k)*(5)c2(n)=c(n)2(6) ##EQU00003##", and insert --
$$c(n) = \sum_{K=0}^{N/3-1} s(n+k) \times r(k)^* \quad (5)$$

$$c2(n) = |c(n)|^2 \quad (6)$$
--

Signed and Sealed this
Fifth Day of January, 2016

Michelle K. Lee
*Director of the United States Patent and Trademark Office*